(12) United States Patent
Weeks

(10) Patent No.: US 6,720,496 B1
(45) Date of Patent: *Apr. 13, 2004

(54) ELECTRICAL BOX FOR SUPPORTING VARIOUS TYPES OF FIXTURES

(75) Inventor: Richard H. Weeks, Little York, NY (US)

(73) Assignee: Reiker Enterprises of Northwest Florida, Inc., Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/994,618

(22) Filed: Nov. 28, 2001

(51) Int. Cl.$^7$ ................................................. H02G 3/08
(52) U.S. Cl. ............................ 174/50; 174/54; 174/57; 220/3.2; 220/4.02
(58) Field of Search .............................. 174/50, 53, 54, 174/57, 58, 59, 61, 63, 62, 48; 220/3.2, 3.3, 3.7, 3.9, 3.8, 4.02; 248/205.3, 906

(56) References Cited

U.S. PATENT DOCUMENTS

| | | |
|---|---|---|
| 950,176 A | 2/1910 | Hublinger |
| 1,040,175 A | 10/1912 | Earhart |
| 1,066,706 A | 7/1913 | Caine |
| 1,805,027 A | 5/1931 | Adell |
| 2,031,689 A | 2/1936 | Buckels |
| 2,423,757 A | 7/1947 | Dedge |
| 2,959,633 A | 11/1960 | Palmer et al. |
| 3,340,349 A | 9/1967 | Zerwes |
| 3,770,872 A | 11/1973 | Brown |
| 3,846,604 A | 11/1974 | Shallbetter |
| 4,037,098 A | 7/1977 | Kowalski |
| 4,062,470 A | 12/1977 | Boteler |
| 4,331,832 A | 5/1982 | Curtis et al. |
| 4,348,547 A | 9/1982 | Bowden, Jr. |
| 4,408,696 A | 10/1983 | Crosson |
| 4,463,923 A | 8/1984 | Reiker |
| D288,289 S | 2/1987 | Reiker |
| 4,684,092 A | 8/1987 | Reiker |
| 4,788,383 A | 11/1988 | Caison |
| RE33,147 E | 1/1990 | Reiker |
| 4,892,211 A | 1/1990 | Jorgensen |
| 4,909,405 A | 3/1990 | Kerr, Jr. |
| 4,919,292 A | 4/1990 | Hsu |
| 4,988,067 A | 1/1991 | Propp et al. |
| 5,065,878 A | 11/1991 | Altmann et al. |
| 5,170,014 A | 12/1992 | Borsh |
| RE34,603 E | 5/1994 | Caison et al. |
| 5,407,088 A | 4/1995 | Jorgensen et al. |
| 5,435,514 A | 7/1995 | Kerr, Jr. |
| 5,606,147 A | 2/1997 | Deschamps et al. |
| 5,661,264 A | 8/1997 | Reiker |
| 5,677,512 A | 10/1997 | Reiker |

(List continued on next page.)

FOREIGN PATENT DOCUMENTS

| | | |
|---|---|---|
| FR | 2 436 518 | 5/1980 |
| GB | 2 214 004 | 7/1989 |
| WO | WO 01/01033 | 1/2001 |

*Primary Examiner*—Dean Reichard
*Assistant Examiner*—Angel R. Estrada
(74) *Attorney, Agent, or Firm*—Shlesinger, Arkwright & Garvey LLP

(57) ABSTRACT

Mounting assembly includes a junction box having a top wall and a downwardly extending side wall defining a cavity therein. A fixture support is provided on the junction box that has a first use position and a second use position, and the fixture support is movable from the first use position to the second use position. The junction box may include a fixture support attached to the junction box, and a first fixture fastener provided on the fixture support. The first fixture fastener may be sized for securing a first type of fastener. A second fixture fastener sized for securing a second size of fastener may be provided on the fixture support. The fixture support may be rotated between a use position for the first fixture fastener and a non-use position for the first fixture fastener. The first and second fixture fasteners maybe sized for receiving, respectively, different sizes of fasteners.

40 Claims, 7 Drawing Sheets

U.S. PATENT DOCUMENTS

| | | |
|---|---|---|
| 5,710,392 A | 1/1998 | Bordwell et al. |
| 5,728,973 A | 3/1998 | Jorgensen |
| 5,824,952 A * | 10/1998 | Bordwell et al. ............ 174/53 |
| 5,854,443 A | 12/1998 | Reiker |
| 5,857,581 A | 1/1999 | Jorgensen |
| 5,860,548 A | 1/1999 | Kerr, Jr. |
| 5,873,556 A | 2/1999 | Reiker |
| 5,883,331 A | 3/1999 | Reiker |
| 5,907,124 A | 5/1999 | Reiker |
| 5,909,006 A | 6/1999 | Reiker |
| 5,938,157 A | 8/1999 | Reiker |
| 5,942,726 A | 8/1999 | Reiker |
| 5,950,853 A | 9/1999 | Jorgensen |
| 5,965,845 A | 10/1999 | Reiker |
| 5,981,874 A | 11/1999 | Reiker |
| 6,036,337 A | 3/2000 | Belfer |
| 6,096,974 A | 8/2000 | Reiker |
| 6,170,685 B1 * | 1/2001 | Currier ..................... 220/3.2 |
| 6,204,450 B1 | 3/2001 | Reiker |
| 6,207,894 B1 | 3/2001 | Reiker |
| 6,207,897 B1 | 3/2001 | Reiker |
| 6,207,898 B1 | 3/2001 | Reiker |
| 6,242,696 B1 | 6/2001 | Reiker |
| 6,291,768 B1 | 9/2001 | Reiker |
| 6,303,859 B1 | 10/2001 | Reiker |
| 6,303,862 B1 | 10/2001 | Reiker |
| 6,545,216 B1 * | 4/2003 | Bell et al. .................... 174/50 |

* cited by examiner

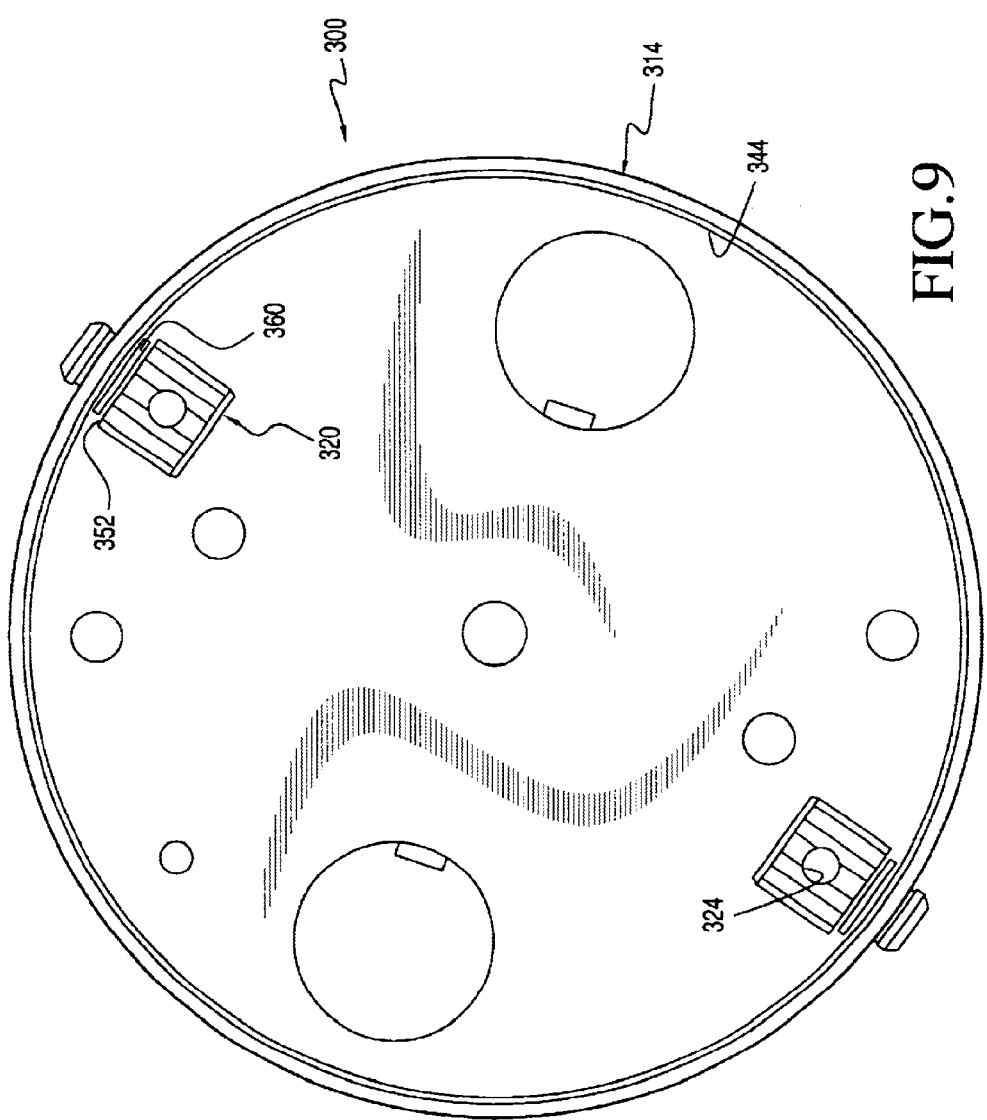

ELECTRICAL BOX FOR SUPPORTING
VARIOUS TYPES OF FIXTURES

CROSS REFERENCE TO RELATED
APPLICATIONS

This application relates to application Ser. No. 09/994,619, filed Nov. 28, 2001, now U.S. Pat. No. 6,545,216 to Bell et al., issued Apr. 8, 2003, and which is incorporated herein by reference.

FIELD OF THE INVENTION

This invention relates to mounting assemblies. More specifically, this invention relates to junction boxes which are suited for supporting different types and sizes of fixtures having different sizes and types of fixture fasteners. Even more particularly, the invention relates to junction boxes suited for alternately supporting different types of electrical fixtures, such as lightweight fixtures, ceiling fans, chandeliers, and heavy duty light fixtures, chandeliers, and ceiling fans, for example.

BACKGROUND OF THE INVENTION

Mounting assemblies including junction boxes are known.

Examples of known load supporting electrical boxes to Reiker include: U.S. Pat. No. 5,854,443; U.S. Pat. No. 5,883,331; U.S. Pat. No. 5,907,124; U.S. Pat. No. 5,981,874; U.S. Pat. No. 5,677,512; U.S. Pat. No. Re. 33,147; U.S. Pat. No. Des. 288,289; U.S. Pat. No. 4,684,092; U.S. Pat. No. 4,463,923; U.S. Pat. No. 5,965,845; U.S. Pat. No. 5,661,264; U.S. Pat. No. 5,942,726; U.S. Pat. No. 6,096,974; U.S. Pat. No. 5,909,006 U.S. Pat. No. 5,873,556; U.S. Pat. No. 5,938,157; U.S. Pat. No. 6,207,897; U.S. Pat. No. 6,204,450; U.S. Pat. No. 6,207,894; U.S. Pat. No. 6,207,898; U.S. Pat. No. 6,242,696; U.S. Pat. No. 6,281,439; and U.S. Pat. No. 6,291,768.

OBJECTS AND SUMMARY OF THE INVENTION

It is an object of the invention to provide a two-in-one junction box; i.e., a box which can be used to support at least two types of fixtures, such as light fixtures, ceiling fans, and chandeliers.

It is yet another object of the invention to provide a junction box which can be readily converted from a light fixture junction box to a ceiling fan/chandelier supporting junction box and vice-versa.

It is another object of the invention to provide a junction box which is stronger than conventional junction boxes.

Yet another object of the invention is to provide a junction box which is stronger than conventional junction boxes with the addition of a few additional components.

It is a still further object of the invention to provide a junction box convertible from a fixture support sized for a first size of fixture fastener to a fixture support sized for a second size of fixture fastener, the second size of fixture fastener differing from the first size of fixture fastener.

It is another object of the invention to provide a junction box which is convertible from one type of fixture fastener to a different type of fixture fastener.

It is a still further object of the invention to provide a junction box convertible from a fixture support sized for a first size of fixture fastener to a fixture support sized for a second size of fixture fastener that differs from the first size of fixture fastener, while maintaining a predetermined fixture fastener offset.

It is another object of the invention to provide a junction box which is convertible from one type of fixture fastener to a different type of fixture fastener, while maintaining a predetermined fixture fastener offset.

Another object of the invention is to provide a junction box which is more cost-effective to produce.

A further object of the invention is to provide a junction box which is easier to assemble than known junction boxes.

Yet another object of the invention is to provide a two-in-one type junction box having a fixture support suited for supporting two different types of fixtures requiring two different sizes of fixture fasteners and that has only one outwardly facing size of, fixture support at a time; e.g., so that the user always knows with certainty which fixture support is to be used.

Yet another object of the invention is to provide a junction box which can accommodate substantially any length of fixture fastener.

In summary, the invention is directed to a mounting assembly including a junction box having a top wall and a downwardly extending side wall defining a cavity therein. A fixture support it is provided on the junction box that has a first use position and a second use position, and the fixture support is movable from the first use position to the second use position.

The invention is likewise directed to a mounting assembly including a junction box having a top wall and a downwardly extending side wall defining a cavity therein. A fixture support is attached to the junction box, and a first fixture fastener is provided on a fixture support. The first fixture fastener is sized for securing a first type of fastener. A second fixture fastener sized for securing a second size of fastener may be provided on the fixture support. The fixture support is moveable between a use position for the first fixture fastener and a non-use position for the first fixture fastener.

BRIEF DESCRIPTION OF THE DRAWINGS

FIG. 9 is a plan view of the mounting assembly of FIG. 8;

FIG. 10 is an enlarged, cross sectional view of a wave washer usable with the embodiment of FIG. 8.

The term "mounting assembly" refers to a device, such as junction box or electrical box, which may be used to mount another object, such as an electrical fixture, to a surface to which the mounting assembly is mounted. A junction box or an electrical box in its basic form may be considered a box having at least one wall defining a cavity therein. Typically, a junction box will have a top wall and one or more downwardly extending sidewalls which define a cavity therein, the cavity being used for receiving electrical wires, electrical connections, and the like. It will be understood that the terms junction box and electrical box may be used interchangeably, and may be used for convenience to refer to a mounting assembly collectively.

Relative terms such as up, down, left, and right are for convenience only and are not intended to be limiting.

The term "non-use position" does not mean that the position has no use; rather, it means, in the case of the fixture support described below, for example, that it is free to be used for a different purpose, and it is not being used for supporting an outwardly extending fixture fastener, for example. In other words, there may be a different use for the fixture fastener in its non-use position, such different use being a use other than being used as one of the main supports for a fixture. If may be used to provide supplemental support to a fixture or to indicate which fixture support is not being used, for example; hence, which of two fixture supports is being used, by process of elimination.

DETAILED DESCRIPTION OF THE INVENTION

Figure 1:
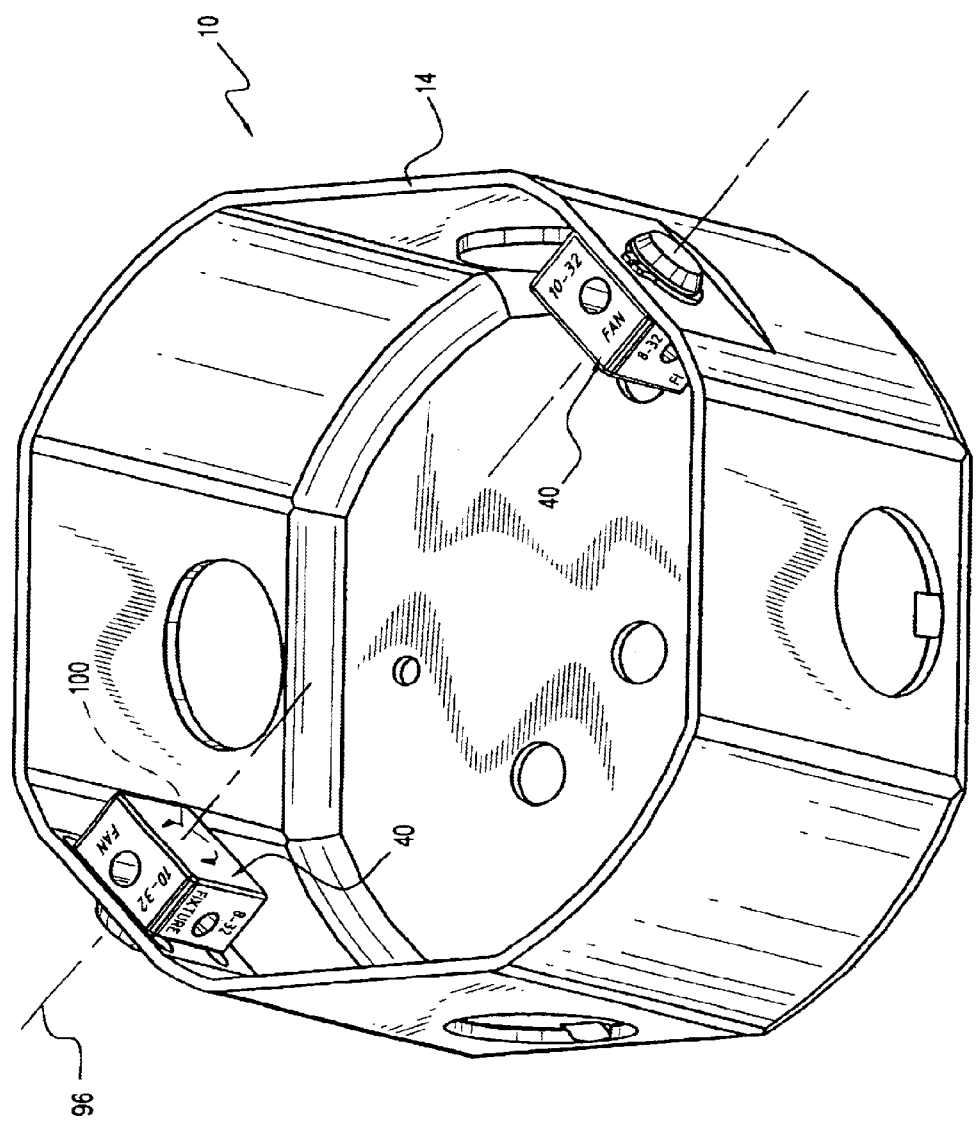
FIG. 1 illustrates an embodiment of a mounting assembly according to the invention.
Figure 2:
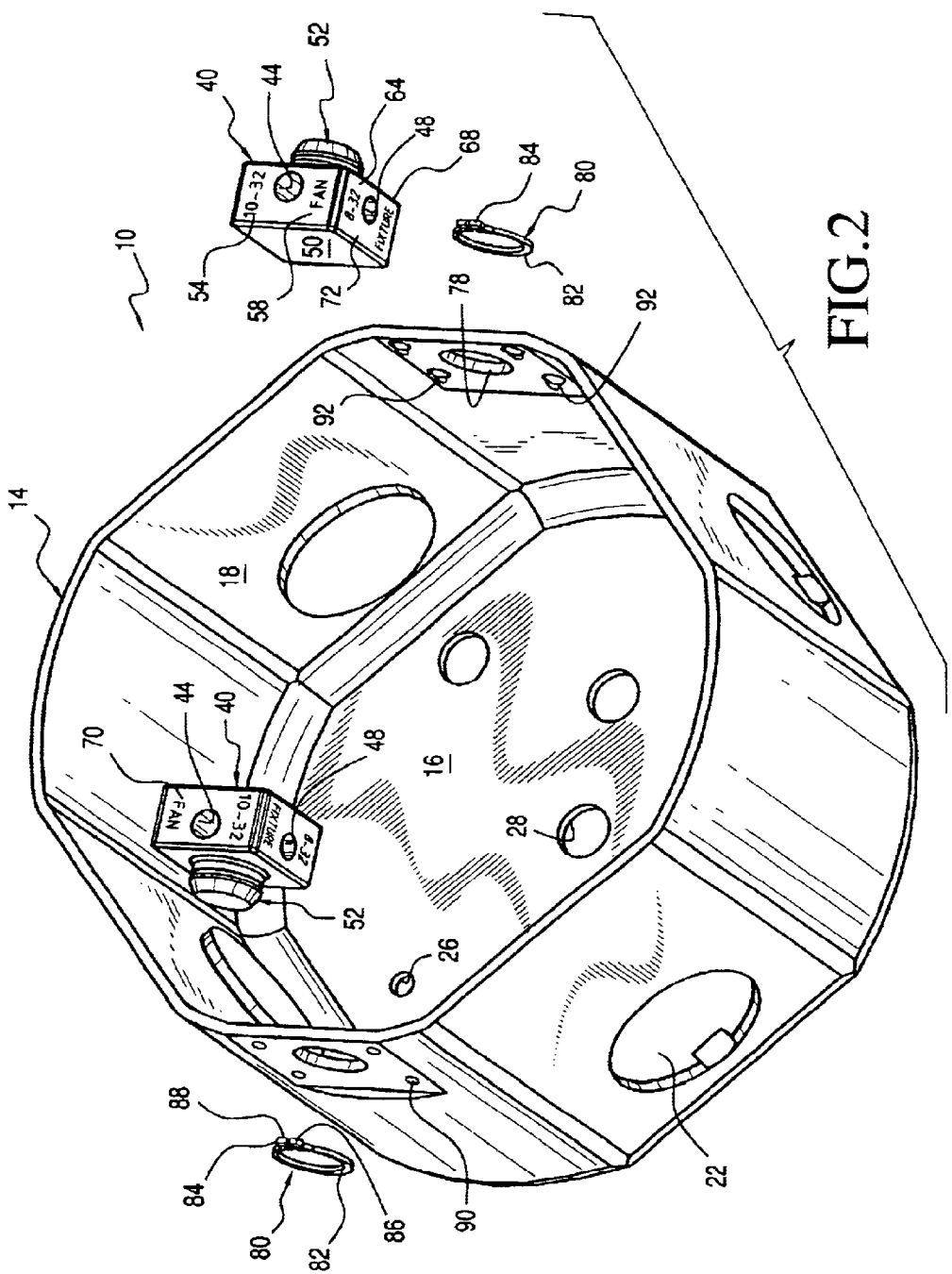
FIG. 2 is an exploded, perspective view of the mounting assembly embodiment of FIG. 1.
Figure 3:
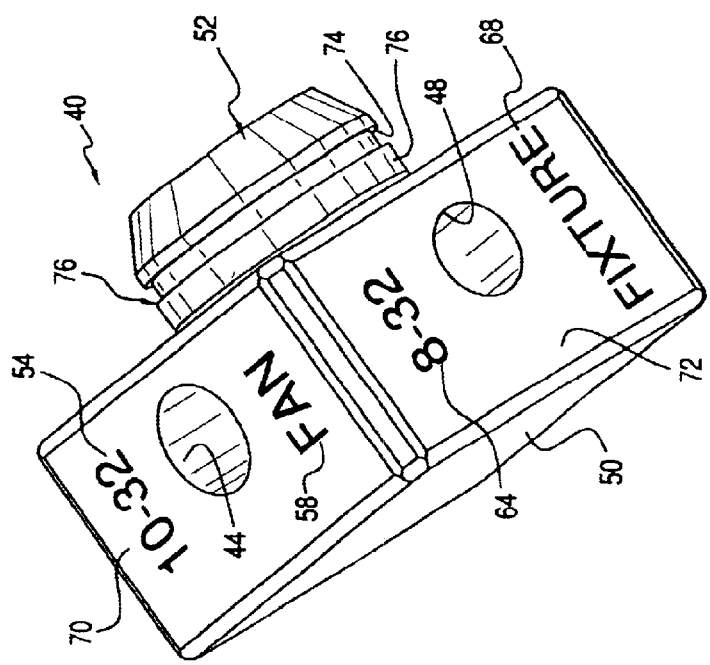
FIG. 3 is an enlarged, perspective view of a fixture support usable with the junction box embodiment of FIG. 1.

FIGS. 1–3 illustrate an embodiment of a mounting assembly 10 according to the invention.

Mounting assembly 10 may include a junction box 14 having a top wall 16 and a downwardly extending side wall 18. Top wall 16 and side wall 18 define a junction box cavity therein. The cavity may be used in a conventional manner to enclose electrical wiring associated with an electrical fixture, such as a light fixture, ceiling fan, or chandelier, for example. Such electrical fixtures may be supported by junction box 10, as will be described below.

Junction box 10 may include so-called knock-outs 22, which are removable, and when partially or completed removed, in use, leave apertures through which wiring may be inserted, in a known manner.

A hole 26, which may be pre-threaded, may be provided in top wall 16, and may receive a conventional pre-threaded or self-tapping grounding screw which may be inserted and attached.

One or more further threaded or unthreaded apertures 28 may be provided in top wall 16.

Such apertures 28 may be sized and located for use as attachment sites, through which screws or nails will be inserted for attaching electrical box 10 to a support, such as an unillustrated stud, brace, or joist, for example, in a known fashion.

One or more fixture supports 40 may be provided.

Fixture supports 40 may be sized for supporting light-weight fixtures, such as lights, or supports 40 may be sized for supporting heavy duty light fixtures, ceiling fans, and/or chandeliers, and may be heavy duty fixture supports in accordance with the National Electrical Code (N.E.C.) of the United States, and or the International Standards Organization (ISO), or Deutsche Industrie Norm (DIN) standards, and the like.

Fixture support 40 may be provided with at least one size of fixture fastener 44 sized for securing a standard 10/32 inch male fastener of the type conventionally required for chandeliers of 35 pounds or more or 50 pounds or more, per local and national building codes, for example. In that case, fastener 44 would be the illustrated female fastener; e.g., a threaded hole.

Alternatively, it is contemplated that fastener 44 be a male fastener to which a female fastener, such as a mating nut be attached.

Further, a second size of fixture fastener 48 may be provided. Fixture fastener 48 may differ in size from fastener 44 so that a different size of a mating fixture fastener of a fixture to be attached can be mated with and attached thereto. Fixture fastener 48 may be the illustrated 8/32 inch female fastener (i.e., the threaded hole, as shown). As with fixture fastener 44, fixture fastener 48 may be male or female, of any size, or sized in accordance with known standards.

For certain applications, fixture fasteners 44 and 48 may be of the same size and/or one may be made as a female fastener and the other one may be made as a male fastener.

Fixture support 40 may be attached to junction box 14, such as adjacent the wall 18. Fixture support 40 may be directly attached to wall 18 by the provision of an extension 52 provided on a block 50, for example. Extension 52 may be sized so that fixture support 40 can support light or heavy fixtures, such as light fixtures and chandeliers/ceiling fans, respectively.

Needless to say, fixture support 40 may likewise be appropriately sized.

Conveniently, an indicia 54, such as the illustrated "10–32" may be placed on fixture support 40. Conveniently, indicia 54 may be located substantially adjacent to fixture fastener 44, and may have the designated illustrated fastener size.

In addition, a further or alternate indicia 58, such as the illustrated name or label "FAN" may be provide as a further size indicator or as a substitute for the numeric size indicia. The label "FAN" may assist users who are unsure as to the appropriate fastener size, or who simply would like reassurance that he or she has selected the proper fixture fastener to which the mating fixture fastener of the electrical fixture itself should be attached.

In an analogous fashion, a further indicia 64, such as an illustrated size indicia "8–32" may be provided; again, a still further indicia 68, such as the illustrated label "FIXTURE" may be provided.

The variety and disposition of indicia 64 and 68 may be provided in a manner similar to the manner in which indicia 54 and 58 are provided, as described above.

The labels "FAN" and "FIXTURE" are merely examples. Any appropriate indicia such as "FAN/chan." and/or "FIXT/light" may be substituted, in any language(s) or symbol(s). The size indicia may be ISO or DIN standards or symbols, for example.

Fixture fastener 40 may be configured so that fixture fastener 44 ("FAN") or fixture fastener 48 ("FIXTURE") may be available to receive the mating like fixture fastener or ceiling fan fastener, for example.

One or both of fixture fasteners 44, 48 may be male or female fasteners. In the case of the illustrated female fasteners 44, 48, one or both fasteners 44,48 may extend partially into or completely through block 50.

Extension 52 may be configured appropriately and may extend sufficiently outwardly away from block 50 so that fixture fastener 40 is movably attached to side wall 18. A user may switch from the one size of fixture fastener to the other; namely, from the fixture fastener position in which the indica "10–32" faces outwardly away from top wall 16 in its illustrated use position with face 70 facing outwardly away (as shown in FIG. 1) to a non-use position, that is illustrated as being currently occupied by face 72 (as shown in FIG. 1); i.e., in the position illustrated as being occupied by fastener 48 in FIG. 1.

A groove 74 may be provided on an outwardly extending portion 76 of extension 52.

A corresponding aperture 78 may be sufficiently large so that portion 76 may extend therethrough.

When assembled, after portion 76 has been disposed in and sufficiently extended through aperture 78, and groove 74 is disposed outwardly of side wall 18, a retaining device 80 may be used to secure fixture support 40 to the remainder of junction box 14.

Retaining device 80 may be a retaining ring including a ring portion 82 sized to engage groove 74.

One or more manipulating elements 84 may be provided for attaching/releasing retaining device 80 from fixture support 40; i.e., from groove 74.

Manipulating elements 84 may be in the form of extensions having holes 86 and 88 therein that are sized to mate with a conventional retaining ring attachment/removal device, such as a pair of hand-operated pliers or an automated tool.

Alternatives to retaining device 80 such as nuts and bolts, screws, rivets, and press-fitting may be used, for example.

Detents 90 may be provided that define inwardly protruding extensions 92. One or more extensions 92 may assist in retaining fixture support 40 in its desired orientation.

In use, if a ceiling fan is to be secured to mounting assembly in 10, then respective faces 70 of support 40 will face outwardly away from top wall 16. That orientation of supports 40 is shown in FIG. 1.

If a heavy duty fan or chandelier requiring 10–32 fasteners is to be supported by mounting assembly 10, then each one of the illustrated faces 72 must face outwardly away from the remainder of box 14.

Thus, each one of fixture supports 40 will be rotated ¼ turn (i.e., 90°) about an axis 96 in a direction of rotation 100.

Figure 4:
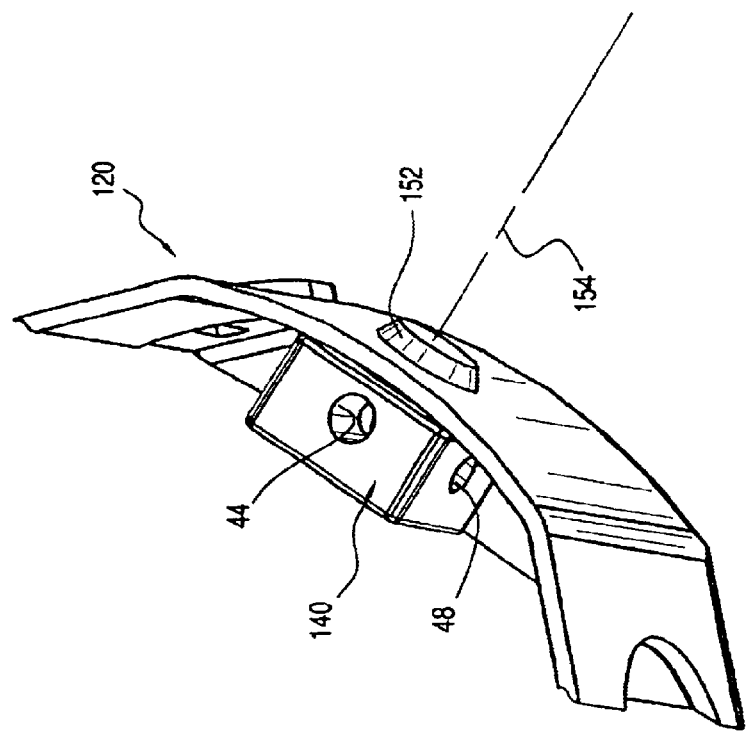
FIG. 4 is a partial perspective view of a further embodiment of a mounting assembly according to the invention.

FIG. 4 is a perspective view of another embodiment of a junction box 120 according to the invention. Only a portion of box 120 is shown for simplicity.

Box 120 may include a fixture support 140 having first fixture fastener 44 and second fixture fastener 48. Fixture support 140 may be rotatable about an axis 154 extending through a screw post or pin 152 which may be used to secure fixture support 140 to the remainder of box 120.

Figure 5:
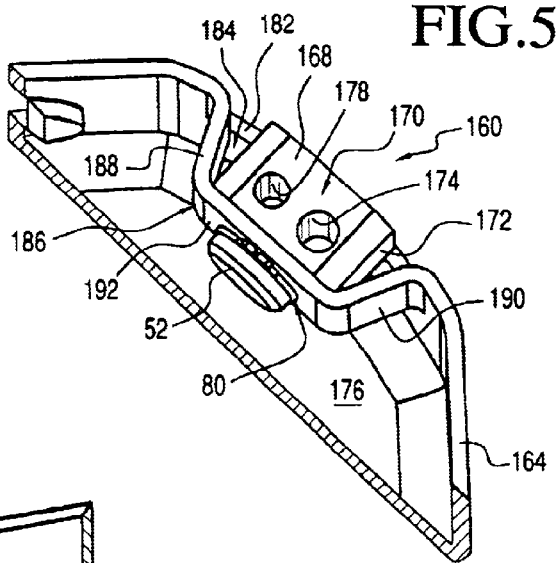
FIG. 5 is a partial perspective view of a mounting assembly according to another embodiment of the invention.

FIG. 5 illustrates a further embodiment of a further embodiment of a junction box 160 according to the invention.

Junction box 160 may have a sidewall 164 and fixture support 170 moveably attached thereto. Fixture support 170 may be secured to box 160 by use of extension 52 which may be secured by snap ring 80, along the lines described above.

Fixture support 170 may be provided with a first fixture fastener 174 and a second fixture fastener 178, each defined in a face 168 of fixture support 170. Both fixture fasteners 174 and 178 are shown in a use position facing outwardly away from junction box 160; e.g., away from a top wall 176 of box 160.

A further face 172 may be provided that extends transversely relative to face 168. One or more fixture fasteners may be provided in face 172 that will be used when rotated to a use position in which face 172 takes the place of face 168, as illustrated.

A cut line or through cut 182 may be defined that establishes an opening or gap 184 between an inwardly extending support 186 for fixture support 170 and a lower portion of sidewall 164. Support 186 may include a first extension 188, a second extension 190, and a fixture supporting region 192 to which fixture support 170 may be attached.

Figure 6:
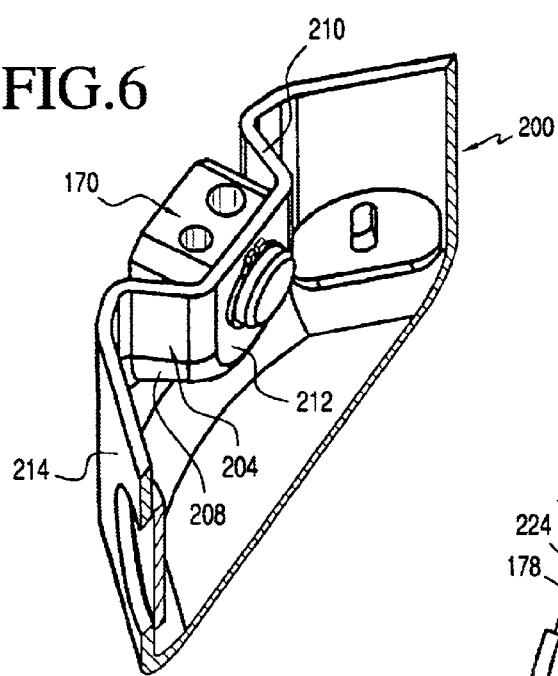
FIG. 6 is a partial perspective view of a mounting assembly according to another embodiment of the invention.

A partial view of a junction box 200 according to another embodiment of the invention is shown in FIG. 6.

Box 200 may include a fixture support 170 as described above. Box 200 may include a fixture supporting support 204 that is somewhat analogous to fixture supporting support 186 of FIG. 5. Fixture supporting support 204 may include an extension 208 and an extension 210, as well as a face 212 to which support 170 may be secured.

Unlike fixture supporting support 186 of FIG. 5, support 204 need define no gap or hole between support 204 and sidewall 214.

Figure 7:
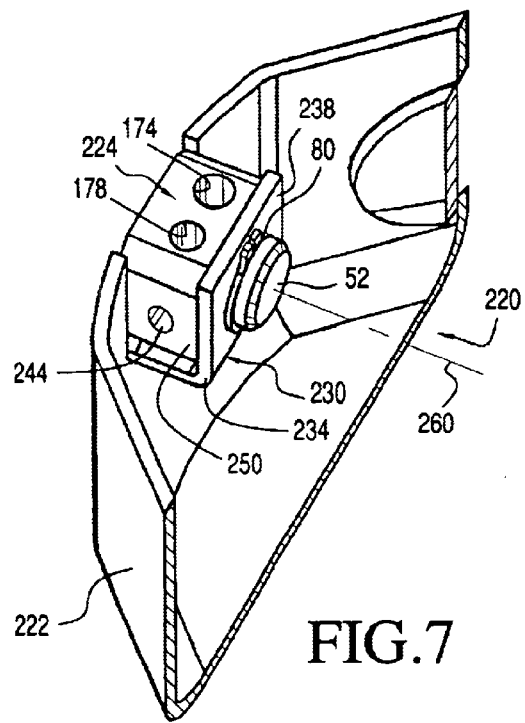
FIG. 7 is a partial perspective view of a mounting assembly according to another embodiment of the invention.

FIG. 7 illustrates a junction box 220 having a sidewall 222 according to another embodiment of the invention.

Box 220 may include a fixture support 224.

Box 200 may be provided with a sidewall 222 and a fixture supporting support 230 which may extend inwardly from sidewall 222 into the cavity of box 220. Fixture supporting support 230 may include an extension 234 and a face or region 238 to which fixture support 224 is secured by use of extension 52 and snapring 80, as described above.

A third fixture fastener 244 may be provided in a face or region 250 of fixture support 224.

Fixture support 224 is shown in a position in which both fixture fasteners 174 and 178 may be in the use position. As shown in FIG. 7, fixture fastener 244 extending transversely away from fixture fasteners 174, 178 may be in a non-use position facing into the cavity of box 220.

It is contemplated that fixture fastener 244, as shown, may be in a use position.

If fixture fastener 244 has a use position in which fixture fastener 244 extends outwardly away from the remainder of box 220, it will be readily appreciated that the user will rotate fixture support 224 about an axis 260 until fixture fastener 244 faces outwardly away from the remainder of box 220; i.e., faces in a direction similar to the direction now faced by (and in the location now occupied by) fixture fasteners 174, 178. For example, the user could grasp fixture support 224 with his or her fingers or engage fixture support 224 with a tool and rotate support 224 about one quarter of a turn or about ninety degrees (as illustrated).

If fixture support 224 had six sides and was in a substantially hexagonal configuration, the user might have to rotate the fixture support only one sixth of a turn or about sixty degrees in order to change from the use position of one fastener to the use position of another fastener depending, of course, on the relative angles defined by the axes of use of the fasteners when in their respective use and non-use positions.

Figure 8:
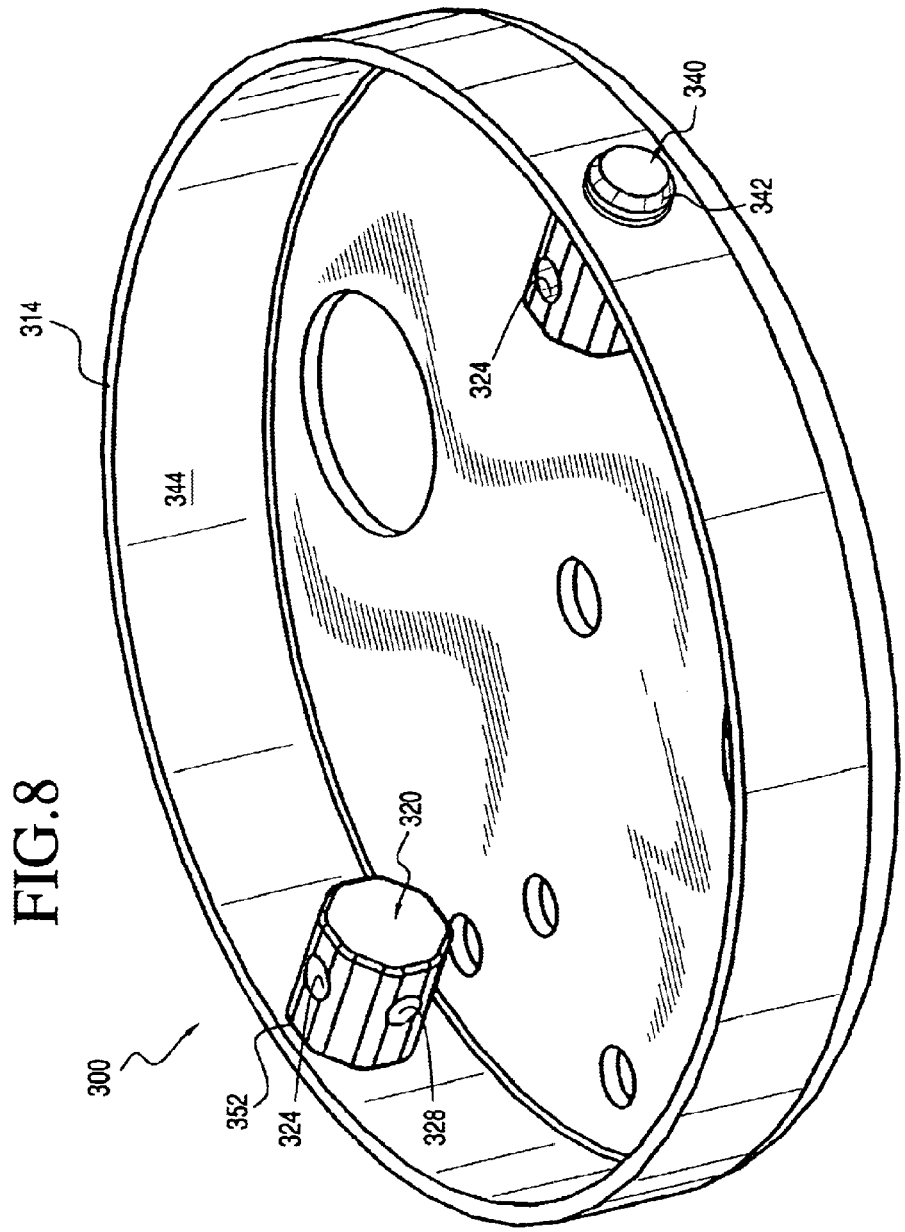
FIG. 8 is a perspective view of a mounting assembly according to a further embodiment of the invention.

FIGS. 8–10 illustrate another embodiment of a junction box 300 according to the invention.

Box 300 may include a sidewall 314 and one or more fixture supports 320.

Supports 320 may include a first fixture fastener 324 and a second fixture fastener 328.

As in the other embodiments, each of first and second fixture fasteners 324, 328 may be the same size or different sizes, such as 8–32, 10–32, or any other threaded, unthreaded, male or female fastener or fasteners or securing region(s) or element(s).

An extension 340 may be provided on fixture support 320.

Extension 340 may include a securing element 342 to secure fixture support 320 to a portion of box 300, such as sidewall 314. Fixture support 320 may be rotatably attached to sidewall 314, and may include a press fit element for fixedly securing fixture support 320 to sidewall 314.

A tensioning member 360 may be provided between an inner face 344 of sidewall 314 and an outer end 352 of fixture support 320. Outer end 352 may be considered a contact region of fixture support 320 adjacent sidewall 314, in use. Tensioning member 360 may be in the form of a wave washer, belleville washer, lock washer, or the like, for example, as shown in detail in FIGS. 9 and 10.

As shown in FIG. 10, tensioning member 360 in the form of a wave washer will typically not be flat, when not in use. In that manner, as will be readily appreciated, in use, when wave washer 360 is located between free end 352 and inner face 344 of sidewall 314, the tensioning member 360 may be somewhat flattened. Thanks to the flattening of wave washer 360, the desired tensioning will be achieved, as tensioning member 360 will be exerting force in an effort to return to its at rest position shown in FIG. 10.

Figure 11:
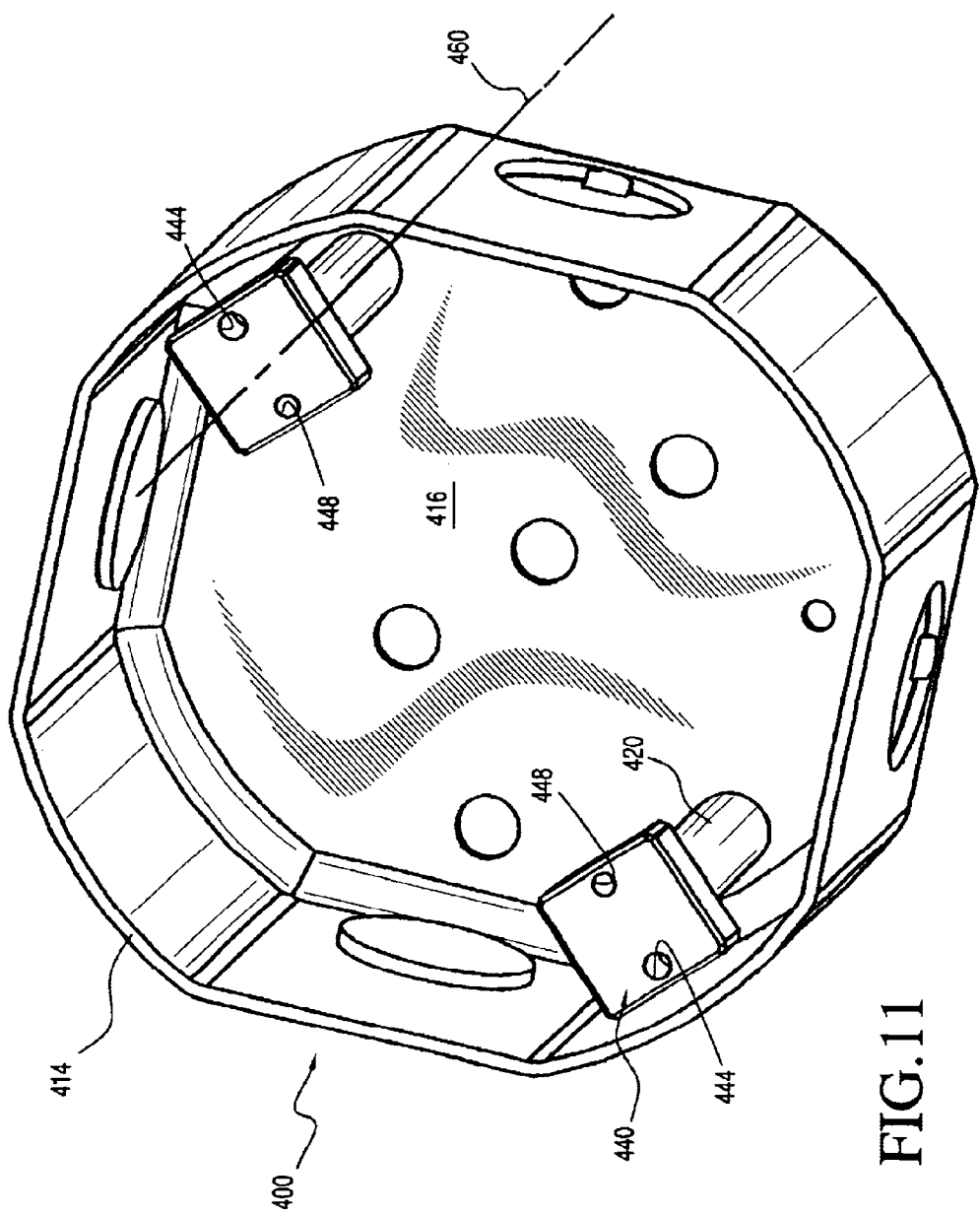
FIG. 11 is a perspective view of another embodiment of the mounting assembly according to the invention.

FIG. 11 illustrates a further embodiment of a junction box 400 according to the invention. Junction box 400 may include a sidewall 414 and a top wall 416. Sidewall 414 may extend downwardly away from top wall 416 and define a cavity of a junction box 400.

One or more fixture supporting supports 420 may be provided. Support 420 may be provided adjacent to top wall 416 and/or sidewall 414.

One or more fixture supports 440 may be provided on support 420. One or more of fixture supports 440 may be movable relative to support 420. Fixture support 440 may include a first type of fixture fastener 444 and a second type of fixture fastener 448. One or both of fixture fasteners 444 and 448 may be moved from a use position to a non-use position. For discussion purposes, the two illustrated fixture fasteners 448 may be considered to be in their respective use positions. In such a case, fixture fasteners 448 would be offset from each other at a desired distance (e.g., 2¾ inches) for securing a fixture to be supported by fixture fastener 448.

It will be appreciated that the position presently occupied by one or both of fixture fasteners 444 could just as well be the use position of fixture fastener 444 and the position of one or both of fixture fasteners 448 could be the non-use position(s).

Fixture support 440 may be moveable from a use position for fixture fastener 448, for example to a non-use position for fixture fastener 448 by rotation about an axis 460, for example.

Each of the above described junction boxes and components may be made of plastics, fiberglass reinforced plastics (FRP), extruded materials, molded and/or stamped metal(s), and the like. The fixture fasteners may be male, female, threaded or unthreaded female fasteners configured to received self-tapping male fasteners, through holes configured to receive nuts and bolts for securing a fixture to the respective fixture support, and the like.

Any of the components described in the various embodiments may be interchanged, as required, and one or more types of fixture supports or fixture fasteners may be used in a single junction box.

It is contemplated that any of the moveable fixture supports may be made rotatable with elements, such as the above described detents or tensioning members (e.g., wave washers), as well as completely freely moveable relative to the remainder of the junction box to which the fixture support is attached. For example, it is contemplated that a fixture support could be freely rotatable and oriented in a desired position, the orientation being maintained by the attaching of the fixture fastener and the weight of a supported electrical fixture, in use.

It is contemplated that the moveable fixture support be secured in its desired position by use of a fastener, such as a screw.

It is contemplated that any of the above-described female fasteners be sufficiently long to accommodate different lengths of male fixture fasteners or any of the above-described female fasteners extend completely through the fixture support so that a fixture fastener having a length greater than the thickness of the fixture support could be used; i.e., the male fastener would extend completely through the fixture support and out another portion of the fixture support.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A mounting assembly, comprising:
   a) a junction box including a top wall and a side wall defining a cavity therein;
   b) a fixture support movably attached to the side wall;
   c) a first fixture fastener provided on the movable support, the first fixture fastener being sized for engaging a first size of fastener;
   d) the fixture support being movable about an axis extending substantially perpendicular to the top wall between a use position and a non-use position, the first fixture fastener being disposed for a engaging a first fastener when in the use position; and
   e) the use position for the first fixture fastener being a position in which the first fixture fastener faces outwardly away from the top wall, and the non-use position for the first fixture fastener being a position in which the first fixture fastener faces outwardly from the top wall.

2. A mounting assembly as in claim 1, wherein:
   a) a second fixture fastener is provided on the fixture support, the second fixture fastener being sized for engaging a second size of fixture fastener.

3. A mounting assembly as in claim 2, wherein:
   a) the size of the first fixture fastener differs from the size of the second fixture fastener.

4. A mounting assembly as in claim 1, wherein:
   a) the first fixture fastener includes a female fastener.

5. A mounting assembly as in claim 1, wherein:
   a) the fixture support includes a block.

6. A mounting assembly as in claim 5, wherein:
a) the block includes a first face and a second face; and
b) the first face faces substantially outwardly away from the top wall when the first fixture fastener is in a use position.

7. A mounting assembly, comprising:
a) a junction box including a top wall and a downwardly extending side wall defining a cavity therein;
b) a fixture support provided on the junction box, the fixture support having a first use position and a first non-use position;
c) the fixture support being movable about an axis extending transversely relative to the side wall; and
d) the fixture support being movable from the first use position to the first non-use position.

8. A mounting assembly as in claim 7, wherein:
a) the fixture support is rotatable about the axis between the first use position and the first non-use position.

9. A mounting assembly as in claim 7, wherein:
a) a first fixture fastener is provided on the fixture support, the first fixture fastener being configured and disposed for securing a first size of fixture fastener when the fixture support is in the first use position.

10. A mounting assembly as in claim 9, wherein:
a) the first fixture fastener includes a female fastener.

11. A mounting assembly as in claim 10, wherein:
a) the fixture support includes a block.

12. A mounting assembly as in claim 11, wherein:
a) the block includes a first face and a second face; and
b) the first face faces substantially outwardly away from the top wall when the fixture support is in the first use position.

13. A mounting assembly as in claim 11, wherein:
a) the block includes a first face and a second face;
b) the first face faces substantially outwardly away from the top wall when the fixture support is in the first use position; and
c) the second face faces transversely to the top wall when the first face is in the first use position.

14. A mounting assembly as in claim 11, wherein:
a) the block includes a first face and a second face;
b) the first face faces substantially outwardly away from the top wall-when the fixture support is the first use position; and
c) the second face faces substantially outwardly away from the top wall when the fixture support is in a second use position.

15. A mounting assembly as in claim 9, wherein:
a) the first fixture support is rotatable about the axis from the use position to the second use position.

16. A mounting assembly, comprising:
a) a junction box having a top wall and a downwardly extending side wall defining a cavity therein;
b) a fixture support attached to the junction box, and the fixture support being rotatable relative to the junction box;
c) a first fixture fastener provided on the fixture support;
d) a second fixture fastener provided on the fixture support;
e) a third fixture fastener provided on the fixture support; and
f) at least one of the first, second, and third fixture fasteners being movable between a use position and a non-use position.

17. A mounting assembly as in claim 16, wherein:
a) each of the first, second, and third fixture fasteners has a use position and a non-use position.

18. A mounting assembly-as in claim 16, wherein:
a) when the at least one fixture fastener is in its use position, at least one of the fixture fasteners is in a non-use position.

19. A mounting assembly as in claim 16, wherein:
a) the first fixture fastener is sized for securing a first size of fixture fastener; and
b) one of the second and third fixture fasteners is sized for securing a second size of fixture fastener, the second size of fixture fastener differing from the first size of fixture fastener.

20. A mounting assembly, comprising:
a) a junction box including a top wall and a downwardly extending side wall defining a cavity therein;
b) a fixture support provided on the junction box, the fixture support having a first use position and a first non-use position;
c) the fixture support being movable about an axis extending transversely relative to the side wall;
d) the fixture support being movable from the first use position to the first non-use position;
e) the fixture support including a block;
f) the block including a first face and a second face;
g) the first face faces substantially outwardly away from the top wall when the fixture support is in the first use position; and
h) the second face faces transversely to the top wall when the first face is in the first use position.

21. A mounting assembly as in claim 20, wherein:
a) a first fixture fastener is provided on the fixture support, the first fixture fastener being usable for securing a first size of fixture fastener when the fixture support is in the first use position.

22. A mounting assembly as in claim 20, wherein:
a) the second face includes a plurality of faces.

23. A mounting assembly as in claim 21, wherein:
a) the first fixture fastener includes a female fastener.

24. A mounting assembly, comprising:
a) a junction box including a top wall and a downwardly extending sidewall defining a cavity therein;
b) a fixture support provided on the junction box, the fixture support having a first use position and a first non-use position;
c) the fixture support being movable about an axis extending transversely relative to the side wall;
d) the fixture support being movable from the first use position to the first non-use position;
e) the fixture support including a block;
f) the block including a first face and a second face;
g) the first face faces substantially outwardly away from the top wall when the fixture support is in the first use position; and
h) the second face faces substantially outwardly away from the top wall when the fixture support is in a second use position.

25. A mounting assembly as in claim 24, wherein:
a) a first fixture fastener is provided on the fixture support, the first fixture fastener being usable for securing a first size of fixture fastener when the fixture support is in the first use position.

26. A mounting assembly as in claim 25, wherein:
a) the first fixture fastener includes a female fastener.

27. A mounting assembly as in claim 24, wherein:
a) the second face includes a plurality of faces.

28. A mounting assembly, comprising:
a) a junction box including a top wall and a side wall defining a cavity therein;
b) a fixture support movably attached to the side wall;
c) a first fixture fastener provided on the movable support, the first fixture fastener being sized for engaging a first size of fastener;
d) the fixture support being movable between a use position and a non-use position, the first fixture fastener being disposed for a engaging a first fastener when in the use position;
e) the fixture support including a block;
f) the block including a first face and a second face;
g) the first face faces substantially outwardly away from the top wall when the first fixture fastener is in a use position; and
h) the second face faces transversely to the top wall when the first fixture fastener is in its use position.

29. A mounting assembly as in claim 28, wherein:
a) the first fixture fastener includes a female fastener.

30. A mounting assembly as in claim 28, wherein:
a) a second fixture fastener is provided on the fixture support, the second fixture fastener being sized for engaging a second size of fixture fastener.

31. A mounting assembly as in claim 30, wherein:
a) the second fixture fastener includes a female fastener.

32. A mounting assembly as in claim 28, wherein:
a) the second fixture fastener is provided on the second face.

33. A mounting assembly, comprising;
a) a junction box including a top wall and a downwardly extending side wall defining a cavity therein;
b) a fixture support provided on the junction box, the fixture support having a first use position and a first non-use position;
c) the fixture support being movable about an axis extending transversely relative to the side wall;
d) the fixture support being movable from the first use position to the first non-use position; and
e) the fixture support including a block.

34. A mounting assembly as in claim 33, wherein:
a) the fixture support is rotatable about the axis between the first use position and the first non-use position.

35. A mounting assembly as in claim 33, wherein:
a) a first fixture fastener is provided on the fixture support, the first fixture fastener being usable for securing a first size of fixture fastener when the fixture support is in the first use position.

36. A mounting assembly, comprising:
a) a junction box including a top wall and a side wall defining a cavity therein;
b) a fixture support movably attached to the side wall;
c) a first fixture fastener provided on the movable support, the first fixture fastener being sized for engaging a first size of fastener;
d) the fixture support being movable about an axis extending substantially perpendicular to top wall between a use position and a non-use position, the first fixture fastener being disposed for a engaging a first fastener when in the use position; and
e) the fixture support including a block.

37. A mounting assembly as in claim 36, wherein:
a) the block includes a first face and a second face; and
b) the first face faces substantially outwardly away from the top wall when the first fixture fastener is in a use position.

38. A mounting assembly as in claim 36, wherein:
a) the first fixture support is rotatable about the axis from the use position to the non-use position.

39. A mounting assembly, comprising:
a) a junction box having a top wall and a downwardly extending side wall defining a cavity therein;
b) a fixture support attached to the junction box;
c) a first fixture fastener provided on the fixture support, the first fixture fastener being sized for securing a first size of fastener;
d) a second fixture fastener provided on the fixture support, the second fixture fastener being sized for securing a second size of fastener;
e) said fixture support is movable between a use position for the first fixture fastener and a non-use position for the first fixture fastener; and
f) the use position for the first fixture fastener being a position in which the first fixture fastener faces outwardly away from the top wall, and the non-use position for the first fixture fastener being a position in which the first fixture fastener faces outwardly from the top wall.

40. A mounting assembly, comprising:
a) a junction box including a top wall and a downwardly extending side wall defining a cavity therein;
b) a fixture support provided on the junction box, the fixture support having a first use position and a first non-use position;
c) the fixture support being movable about an axis extending transversely relative to the side wall;
d) the fixture support being movable about the transversely extending axis from the first use position to the first non-use position; and
e) the first use position being a position in which the fixture support extends outwardly away from the top wall, and the first non-use position being a position in which the fixture support extends transversely relative to the top wall.

* * * * *